(12) United States Patent
Terakura

(10) Patent No.: US 11,212,488 B2
(45) Date of Patent: Dec. 28, 2021

(54) CONFERENCE SYSTEM

(71) Applicant: SUNCORPORATION, Konan (JP)

(72) Inventor: Keiichi Terakura, Konan (JP)

(73) Assignee: SUNCORPORATION, Konan (JP)

( * ) Notice: Subject to any disclaimer, the term of this patent is extended or adjusted under 35 U.S.C. 154(b) by 0 days.

(21) Appl. No.: 16/646,384

(22) PCT Filed: Oct. 26, 2017

(86) PCT No.: PCT/JP2017/038807
§ 371 (c)(1),
(2) Date: Mar. 11, 2020

(87) PCT Pub. No.: WO2019/082366
PCT Pub. Date: May 2, 2019

(65) Prior Publication Data
US 2020/0275057 A1  Aug. 27, 2020

(51) Int. Cl.
*H04N 7/15* (2006.01)
*G06F 3/01* (2006.01)
(Continued)

(52) U.S. Cl.
CPC ............. *H04N 7/152* (2013.01); *G06F 3/011* (2013.01); *G10L 15/22* (2013.01); *H04L 65/403* (2013.01); *G10L 2015/223* (2013.01)

(58) Field of Classification Search
CPC .... H04N 7/15; H04N 2213/008; H04L 29/06; G10L 15/22; G06F 3/01
(Continued)

(56) References Cited

U.S. PATENT DOCUMENTS

2007/0242129 A1* 10/2007 Ferren .................. H04N 7/15
348/14.01
2008/0098295 A1* 4/2008 Nelson ................ H04L 65/1006
415/233
(Continued)

FOREIGN PATENT DOCUMENTS

JP          05089217 A     4/1993
JP       2006352309 A    12/2006
(Continued)

OTHER PUBLICATIONS

Written Opinion International PCT Application No. PCT/JP2017/038807 dated Dec. 12, 2017 (English translation).
(Continued)

*Primary Examiner* — Melur Ramakrishnaiah
(74) *Attorney, Agent, or Firm* — K&L Gates LLP

(57) ABSTRACT

A conference system includes two or more user devices and an information processing apparatus connected communicably with each of the two or more user devices. The information processing apparatus receives first instruction data from each user device, generates display screen data representing a display screen including a virtual whiteboard displaying a displayed content changed based on the first instruction data, and sends the generated display screen data. Each user device displays the display screen indicated by the display screen data on a displaying unit. The display screen includes the virtual whiteboard displaying the displayed content indicated by generated display content data.

10 Claims, 8 Drawing Sheets

(51) Int. Cl.
  *H04L 29/06* (2006.01)
  *G10L 15/22* (2006.01)
(58) Field of Classification Search
  USPC .......................................... 348/14.01–14.16
  See application file for complete search history.

(56) References Cited

U.S. PATENT DOCUMENTS

| | | | |
|---|---|---|---|
| 2009/0244278 A1* | 10/2009 | Taneja | H04L 12/1831 |
| | | | 348/143 |
| 2010/0277563 A1* | 11/2010 | Gupta | H04N 7/142 |
| | | | 348/14.08 |
| 2012/0221628 A1 | 8/2012 | Fujigaki | |
| 2014/0149880 A1* | 5/2014 | Farouki | H04L 12/1822 |
| | | | 715/748 |
| 2014/0253866 A1* | 9/2014 | Carabajal | G06F 1/203 |
| | | | 351/123 |
| 2016/0054797 A1 | 2/2016 | Tokubo et al. | |
| 2016/0054798 A1 | 2/2016 | Messingher et al. | |
| 2016/0109729 A1* | 4/2016 | Swab | G06F 1/163 |
| | | | 351/116 |
| 2016/0259408 A1 | 9/2016 | Messingher et al. | |
| 2018/0260025 A1 | 9/2018 | Messingher et al. | |

FOREIGN PATENT DOCUMENTS

| | | |
|---|---|---|
| JP | 2012178098 A | 9/2012 |
| JP | 2013175048 A | 9/2013 |
| JP | 2015127925 A | 7/2015 |
| JP | 2017530452 A | 10/2017 |

OTHER PUBLICATIONS

International Search Report for PCT/JP2017/038807 dated Dec. 12, 2017 (English translation).
Supplementary European Search Report for corresponding European Patent Application No. 17929688.4, dated Feb. 16, 2021.

* cited by examiner

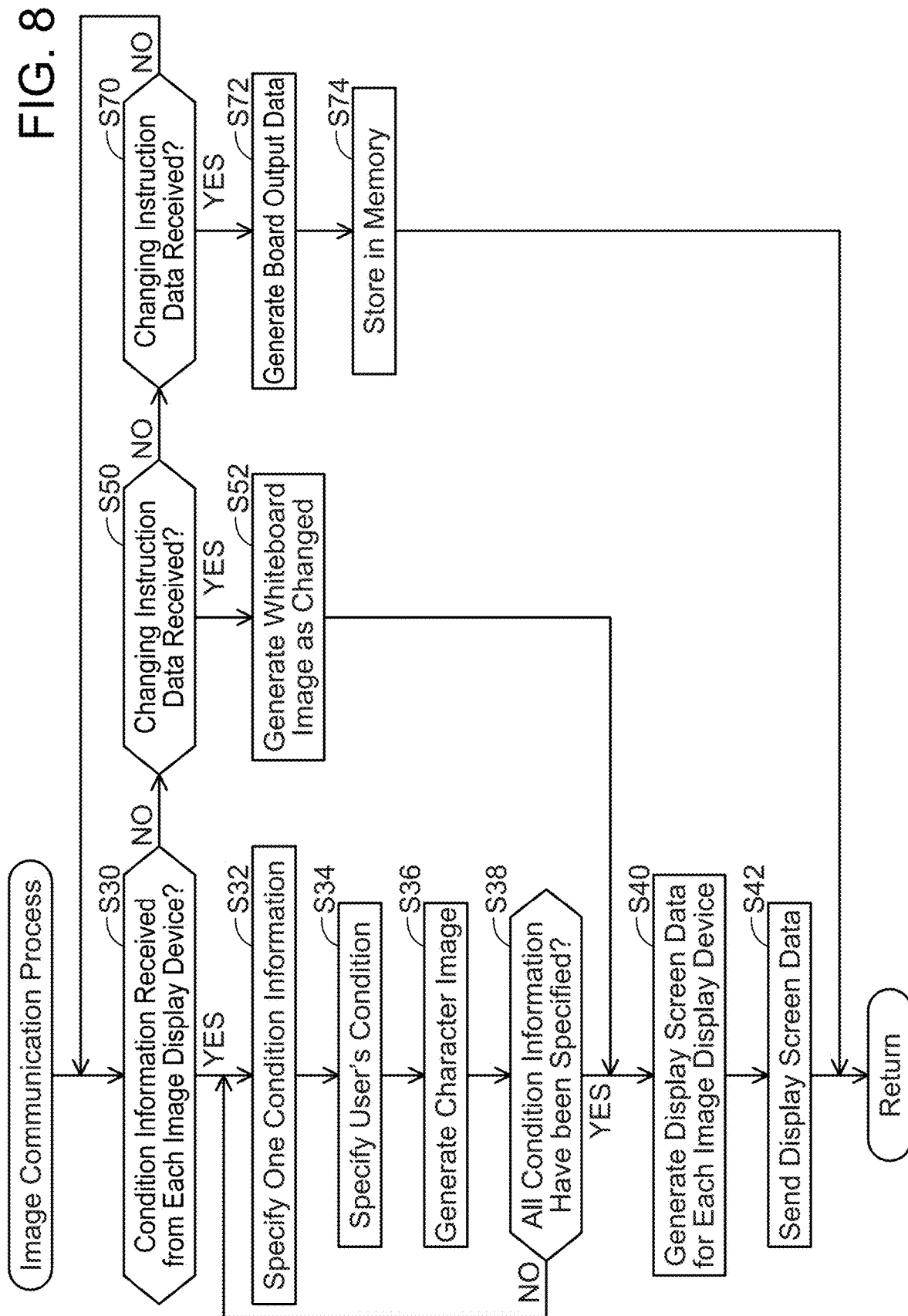

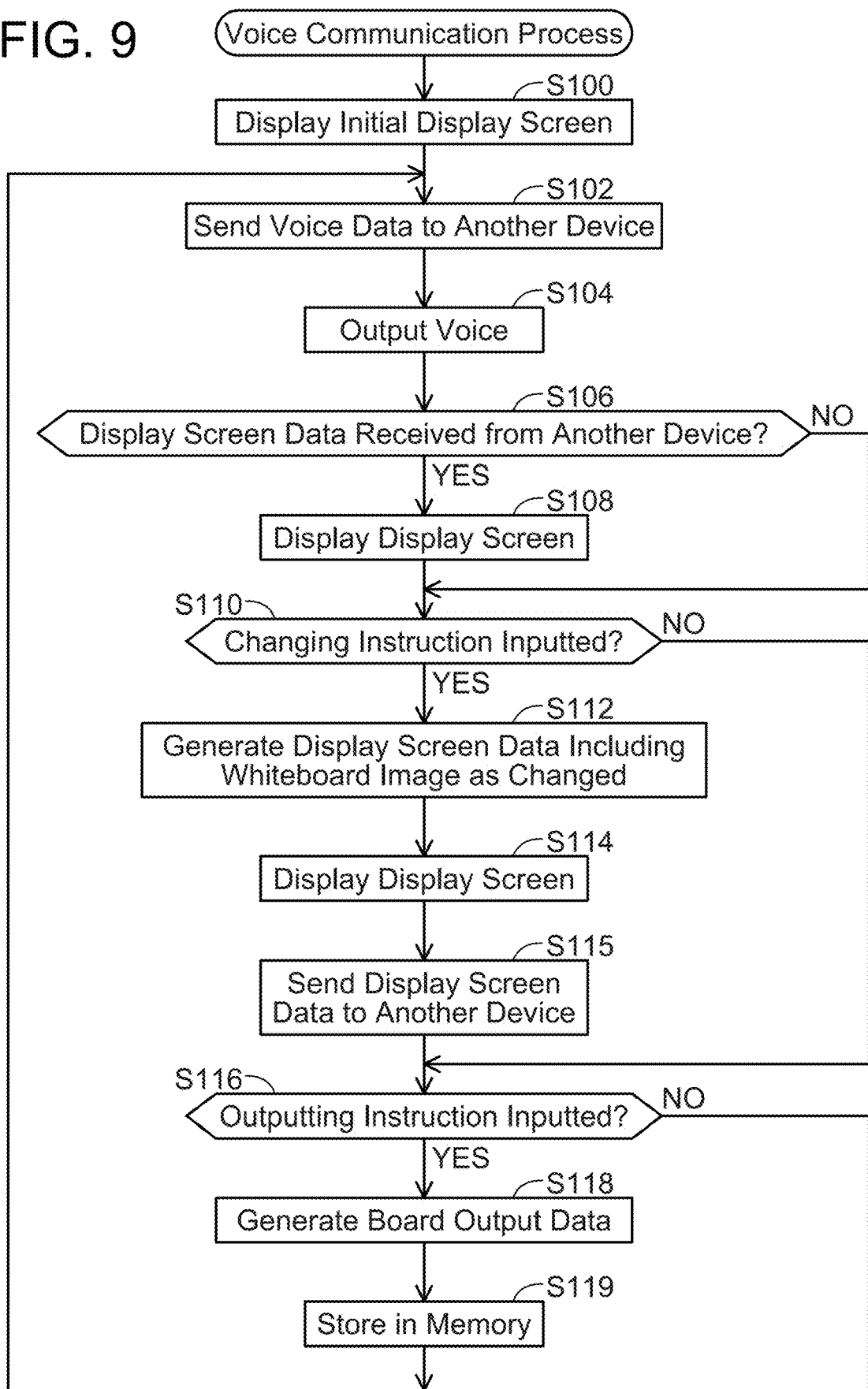

CONFERENCE SYSTEM

CROSS-REFERENCE TO RELATED APPLICATION

This application is a U.S. National Stage Entry under 35 U.S.C. § 371 of International Application No. PCT/JP2017/038807, entitled CONFERENCE SYSTEM and filed Oct. 26, 2017, the disclosure of which is incorporated herein by reference in its entirety and for all purposes.

TECHNICAL FIELD

The art disclosed herein relates to a conference system comprising two or more user devices and an information processing apparatus, and configured to allow users of image display devices to communicate each other while looking at an image.

BACKGROUND ART

For example, Japanese Patent Application Publication No. 2006-352309 (hereafter, Patent Literature 1) describes a telephone having a function of displaying an avatar. This telephone displays a first avatar of a user and a second avatar of a communication counterpart on the other side of the line during a voice communication (i.e., call) with the communication counterpart having a telephone with the same function. Similarly, the first avatar and the second avatar are displayed on a display of the telephone of the of the communication counterpart. The user can change a form of the first avatar of himself/herself by operating the telephone during the voice communication. The form change of the first avatar is also reflected to the first avatar displayed on the display of the telephone of the communication counterpart. This allows for suitable changes of each avatar displayed on the respective displays according to situations of the user, by which smooth communication is facilitated.

SUMMARY OF INVENTION

Technical Problem

There are some cases where a user and a communication counterpart both wish to write information on a shared medium (e.g., a paper or a whiteboard) and have a conversation while seeing the shared medium on which the information is written (i.e., while acknowledging same information). However, it is merely the first and second avatars (i.e., the avatars of the user and the communication counterpart) that are displayed on the displays of the telephones during the voice communication, and no consideration is given to displaying of a medium or space in which each of the user and the communication counterpart is able to write information on the displays. With the technique of Patent Literature 1, the user and the communication counterpart may not sometimes be able to communicate while acknowledging same information written on a shared medium.

The present description provides an art by which respective users of two or more user devices are able to communicate while acknowledging same information written on a shared medium.

A conference system disclosed herein may comprise: two or more user devices; and an information processing apparatus communicably connected with each of the two or more user devices. Each of the two or more user devices comprises: a frame wearable by a user; a displaying unit disposed on the frame and arranged in a field of vision of the user who is wearing the frame; an input unit to which the user inputs an instruction; and a controller. The controller comprises: a first device receiving unit configured to receive display screen data for the user device; a display control unit configured to cause the displaying unit to display a display screen represented by the received display screen data, the display screen including a virtual whiteboard on which each user of the two or more user devices is capable of writing information; and a first device sending unit configured to send first instruction data indicative of a changing instruction to the information processing apparatus in a case where the changing instruction for instructing to change a displayed content on the virtual whiteboard is inputted to the input unit. The information processing apparatus comprises: a first apparatus receiving unit configured to receive the first instruction data; a first apparatus generating unit configured to generate the display screen data for each of the two or more user devices, wherein the virtual whiteboard included in the display screen represented by the display screen data displays the displayed content changed based on the first instruction data; and a first apparatus sending unit configured to send the display screen data generated for each of the two or more user devices.

According to the above features, each of the displaying units of the user devices displays the display screen for that user device. The display screen includes the virtual whiteboard on which each user is able to write. That is, the virtual whiteboard included in the display screen displays information written by each user. By each user looking at the display screen displayed on the displaying unit of his/her user device, each user may look at the shared virtual whiteboard in which the same information is written. Further, by each user inputting the changing instruction to the input unit, each user may change the displayed content of the virtual whiteboard (e.g., additionally writing information, erasing information, changing a displayed board). That is, the respective users can communicate with each other as if they are holding a conference in a space where the virtual whiteboard exists. According to the above features, the respective users of the two or more user devices may communicate with each other while acknowledging same information written on the shared virtual whiteboard.

Each of the first device sending units may be further configured to send second instruction data indicative of an outputting instruction for instructing an output of the displayed content on the virtual whiteboard in a case where the outputting instruction is inputted. The information processing apparatus further may comprise: a second apparatus receiving unit configured to receive the second instruction data; a second apparatus generating unit configured to generate board output data indicative of the displayed content on the virtual whiteboard in a case where the second instruction data is received; and an outputting unit configured to output the board output data.

According to the above features, the board output data indicative of the displayed content of the virtual whiteboard is outputted by one of the users inputting the outputting instruction to the input unit. Here, the "outputting" may include storing the board output data in a storage accessible by the respective user devices, printing the board output data on a medium such as paper, and sending the board output data to a predetermined email address. According the above features, each user may check the displayed content of the virtual whiteboard based on the board output data that has been outputted at any suitable timing after the output of the board output data.

The outputting of the board output data may include causing a storage to which each of the two or more user devices is accessible to store the board output data.

According the above features, each user may check a content of the board output data stored in the storage by accessing the storage via the user device at any arbitrary timing after the board output data has been stored in the storage.

Each of the two or more user devices may further comprise: a microphone to which a first type of voice spoken by the user wearing the frame is inputted; and a speaker configured to output a second type of voice according to voice output data. The controller may further comprise: a second device sending unit configured to send the first type of voice inputted to the microphone to the information processing apparatus; a second device receiving unit configured to receive the voice output data from the information processing apparatus; and a voice output controlling unit configured to cause the speaker to output the second type of voice according to the received voice output data. The information processing apparatus may further comprise: a third apparatus receiving unit configured to receive the first type of voice; a third apparatus generating unit configured to generate the voice output data for each of the two or more user devices; and a second apparatus sending unit configured to send, to each of the two or more user devices, the voice output data generated for the corresponding user device.

According to the above features, the users may engage in voice communication with each other. Even when the users are in remote places, the users may engage in voice communication while acknowledging the same information written on the shared virtual whiteboard.

Each of the input units may include a voice input unit to which the user is capable of inputting an instruction with a first type of voice spoken by the user.

According the above features, each user may input various instructions such as the changing instruction by voice, by which operational burden on each user may be reduced.

Each of the two or more user devices may include: a head-mounted display including the frame, the displaying unit, and the controller; and an operating terminal separate from the head-mounted display, communicable with the head-mounted display, and including the input unit.

According to the above features, when the operating terminal includes the input unit constituted of plural keys and the like, it may be easier for each user to input various instructions by operating the operating terminal. Convenience for each user may be improved.

Each of the two or more user devices may further comprise: an acquiring unit configured to acquire condition information relating to a condition of the user wearing the frame. Each of the controllers may further comprise: a third device sending unit configured to send the condition information acquired by the acquiring unit to the information processing apparatus. The information processing apparatus may further comprise: a fourth apparatus receiving unit configured to receive the condition information; and a fourth apparatus generating unit configured to generate two or more character images, the two or more character images respectively representing the users wearing the two or more user devices, and each of the two or more character images having a display pattern corresponding to a condition indicated by the condition information received from the corresponding user device. The display screen represented by the screen display data may further include at least a part of the generated two or more character images.

According to the above features, the display screen displayed on the displaying units of the user devices of the respective users includes at least a part of the two or more character images. Each character image has the display pattern that corresponds to the condition indicated by the condition information received from the corresponding user device (i.e. condition of the user of the corresponding user device). That is, the character image(s) included in the displayed screen may suitably reflect the condition(s) of the corresponding user(s). Due to this, according to the above features, each user may communicate with each other while looking at the displayed screen on which the conditions of the respective users are suitably reflected even without the users of the respective user devices performing any specific operation.

The two or more user devices may be further communicable with one another without an intervention of the information processing apparatus. Each of the controllers may further comprise: a third device receiving unit configured to receive the display screen data from the user device being a communication counterpart without the intervention of the information processing apparatus; a device generating unit configured to generate the display screen data for each of the two or more user devices in a case where the changing instruction is inputted to the input unit, wherein the virtual whiteboard included in the display screen represented by the display screen data displays a displayed content changed based on the changing instruction; and a fourth device sending unit configured to send the generated display screen data to the user device being the communication counterpart.

According to the above features, even when the user device of each user is unable to communicate with the information processing apparatus, communication may be performed between the user devices without the intervention of the information processing apparatus, by which the users may communicate with each other while acknowledging the same information written on the shared virtual whiteboard.

A control method, a computer program, and a computer-readable medium storing the above computer program for realizing the user devices and the information processing apparatus as aforementioned are also novel and useful.

BRIEF DESCRIPTION OF DRAWINGS

FIG. 8 illustrates a flow chart of an image communication process executed by the controller of the server.
FIG. 9 illustrates a flow chart of a voice communication process executed by a controller of an image display device according to a third embodiment.

FIRST EMBODIMENT (Configuration of Conference System 2; FIG. 1)

A conference system 2 is a system for a plurality of users to hold a conference while looking at a display screen (see FIG. 6 to be described later) including a whiteboard image showing one shared virtual whiteboard. The conference system 2 of FIG. 1 comprises user devices 8A to 8D and a server 100. Each of the user devices 8A to 8D includes a corresponding image display device 10A to 10D and a corresponding terminal device 40A to 40D. Each of the image display devices 10A to 10D is capable of performing Bluetooth (registered trademark) communication with the corresponding terminal device 40A to 40D. Hereafter, Bluetooth may be referred to as "BT". Further, each of the image display devices 10A to 10D is capable of performing Wi-Fi communication with the server 100. In a variant, each of the image display devices 10A to 10D may be capable of performing any suitable near field communication with the corresponding terminal device 40A to 40D instead of performing BT communication. The respective image display devices 10A to 10D are worn on heads of corresponding users 4A to 4D. Each of the image display devices 10A to 10D is allocated with a device ID for identifying the corresponding device ("D01", "D02", "D03", and "D04"). Further, each of the users 4A to 4D has a user ID ("U01", "U02", "U03", and "U04") registered in advance to the server 100. Hereafter, the user devices 8A to 8D, the image display devices 10A to 10D, and the terminal devices 40A to 40D may be referred to as "user device(s) 8", "image display device(s) 10", and "terminal device(s) 40" when they are addressed without the distinction thereamong. Similarly, the users 4A to 4D may be referred to as "user(s) 4" when they are addressed without the distinction thereamong. Although the example of FIG. 1 illustrates only four user devices 8A to 8D, the conference system 2 in actuality may include other user device(s) 8 besides the four devices.

Figure 2:
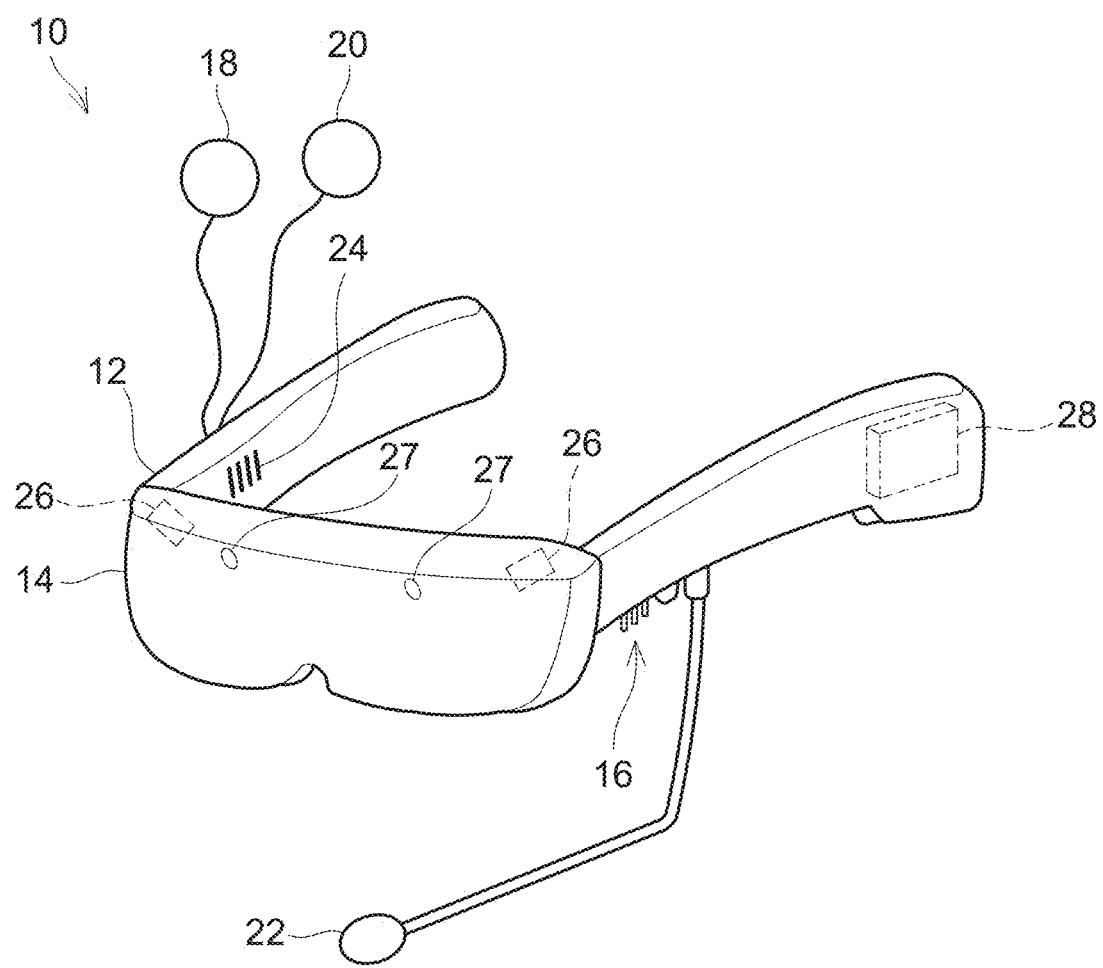
FIG. 2 illustrates an outline of an image display device.
Figure 3:
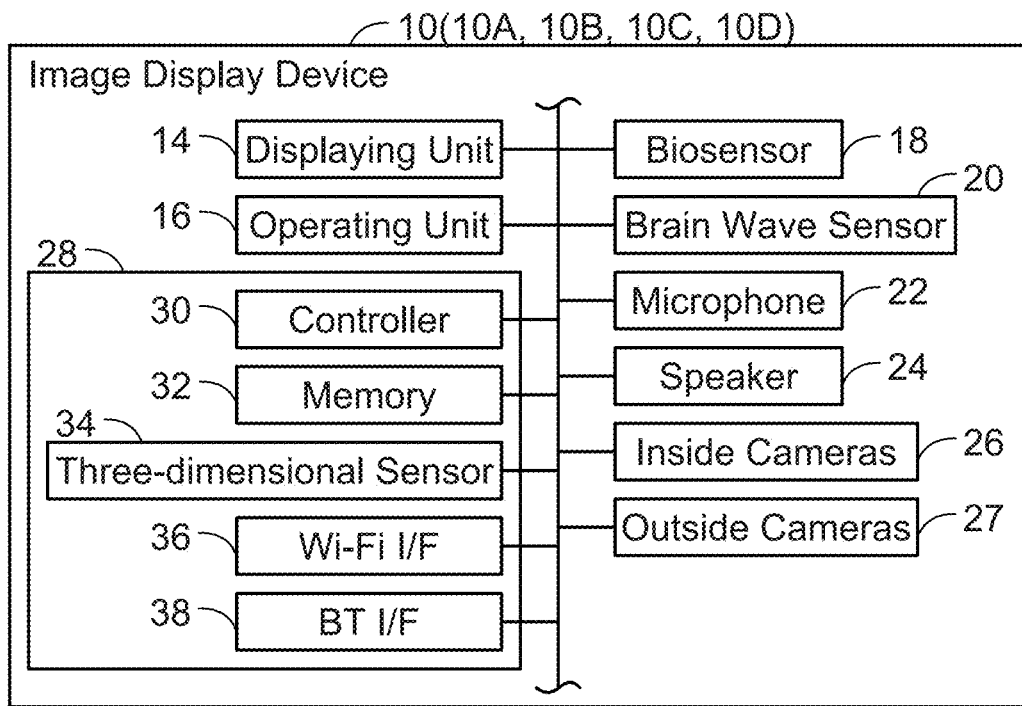
FIG. 3 illustrates a block diagram of the image display device.

(Configuration of Image Display Devices 10; FIG. 1 to FIG. 3)

Figure 1:
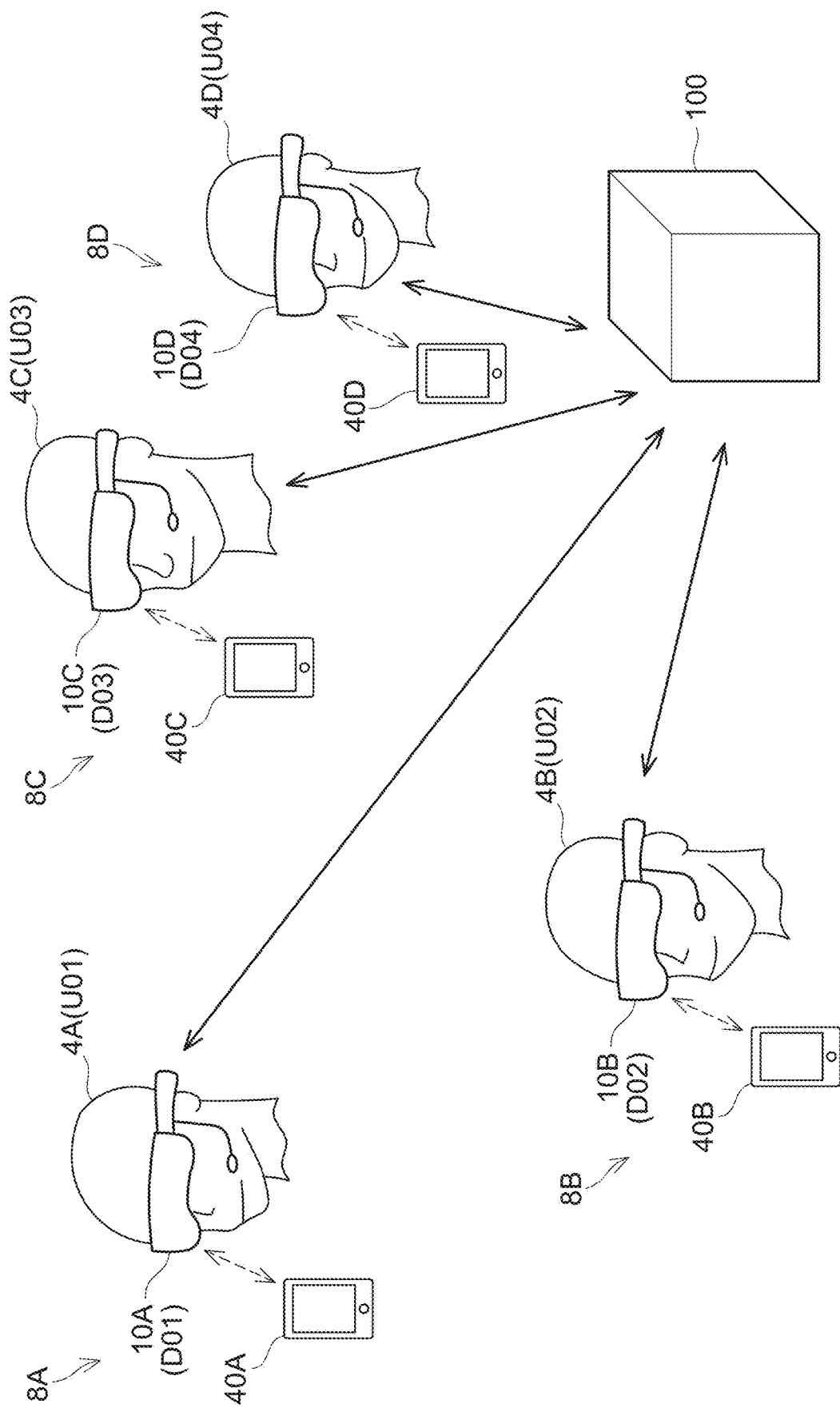
FIG. 1 illustrates an overview of a conference system.

Each of the image display devices 10 (i.e., the image display devices 10A to 10D) shown in FIG. 1 is an image display device used by being worn on a user 4's head (i.e., a so-called head-mounted display). As shown in FIG. 2, the image display device 10 comprises a frame 12, a displaying unit 14, an operating unit 16, a biosensor 18, a brain wave sensor 20, a microphone 22, a speaker 24, inside cameras 26, outside cameras 27, and a control box 28.

The frame 12 is a member having a glasses frame shape. The user 4 can wear the image display device 10 on his/her head by putting on the frame 12 from a front side of his/her face as if the user 4 is putting on glasses.

The displaying unit 14 is a lightproof display member. When the user 4 wears the image display device 10 on his/her head, the displaying unit 14 is positioned at a position facing both eyes of the user 4. When the user 4 wears the image display device 10, a field of vision of the user 4 is blocked by the displaying unit 14. In other embodiments, the displaying unit 14 may be a translucent display such that the user 4 can see his/her surroundings through the displaying unit 14 when the user 4 wears the image display device 10.

The operating unit 16 is arranged on the frame 12. The operating unit 16 includes a plurality of buttons and dials, etc. The user 4 can operate the operating unit 16 to input various operations to the image display device 10.

The biosensor 18 is a sensor configured to detect a pulse rate and perspiration of the user 4 wearing the image display device 10. The biosensor 18 is attached to a part of the frame 12. The user 4 can attach the biosensor 18 to a predetermined position (e.g., head or neck) of his/her body in a state where the user 4 wears the frame 12 on his/her head.

The brain wave sensor 20 is a sensor configured to detect a brain wave of the user 4 wearing the image display device 10. The brain wave sensor 20 is attached to a part of the frame 12. The user 4 can attach the brain wave sensor 20 to his/her head in the state where the user 4 wears the frame 12 on his/her head.

The microphone 22 is a sound input unit configured to input various types of sounds such as voice of the user 4 wearing the image display device 10 and surrounding sounds. The microphone 22 is attached to a part of the frame 12. The microphone 22 is positioned in vicinity of a mouth of the user 4 when the user 4 wears the frame 12 on his/her head (see FIG. 1). The user 4 is able to change the position of the microphone 22 by moving the microphone 22.

The speaker 24 is a sound output unit configured to output various types of sounds such as voice of communication counterpart user(s). The speaker 24 is attached to a part of the frame 12.

The inside cameras 26 are provided on an inner side (i.e., face side of the user 4) of the displaying unit 14. In the example of FIG. 2, two inside cameras 26 are provided. The inside cameras 26 capture the eyes of the user wearing the image display device 10.

The outside cameras 27 are cameras configured to capture a range corresponding to the field of vision of the user 4 wearing the image display device 10. In the example of FIG. 2, two outside cameras 27 are provided. One of the outside cameras 27 captures the range of field of vision of the right eye of the user 4, whereas the other of the outside cameras 27 captures the range of field of vision of the left eye of the user 4.

The control box 28 is a control device incorporated in a part of the frame 12. The control box 28 houses various features that constitute a control system of the image display device 10. Specifically, as shown in FIG. 3, the control box 28 houses a controller 30 a memory 32, a three-dimensional sensor 34, a Wi-Fi interface 36, and a BT interface 37. Hereafter, an interface will be referred to as "I/F".

The controller 30 is configured to execute various processes in accordance with a program stored in the memory 32. Further, the controller 30 is electrically connected with the displaying unit 14, the operating unit 16, the biosensor 18, the brain wave sensor 20, the microphone 22, the speaker 24, the inside cameras 26, the outside cameras 27, the memory 32, the three-dimensional sensor 34, the Wi-Fi I/F 36, and the BT I/F 38, as shown in FIG. 3, and is configured to control operations of these components.

The memory 32 is constituted of a ROM, a RAM, and/or a hard disk for example. The memory 32 stores various programs. Further, the memory 32 stores the device ID allocated to the image display device 10 itself. For example, the memory 32 of the image display device 10A stores the device ID "D01" of its own. Further, the memory 32 includes a space for storing various types of information generated accompanying with processes of the controller 30.

The three-dimensional sensor 34 is a three-dimensional accelerometer sensor. The three-dimensional sensor 34 is configured to detect accelerations of three X, Y, Z axes. The controller 30 can use a detected value of the three-dimensional sensor 34 to determine a posture and a motion state of the image display device 10.

The Wi-Fi I/F 36 is an I/F configured to execute Wi-Fi communication with other device(s) (e.g., the server 100) via the Internet not shown.

The BT I/F 38 is an I/F configured to execute BT communication with other device(s) (specifically the terminal device 40). In the present embodiment, the controller 30 receives instruction signals indicative of various instructions (e.g., changing instruction, outputting instruction) from the terminal device 40 via the BT I/F 38.

Figure 4:
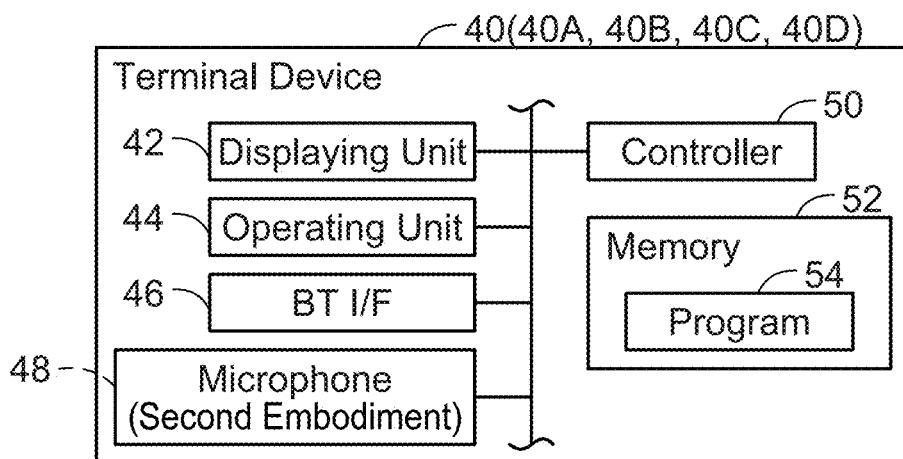
FIG. 4 illustrates a block diagram of a terminal device.

(Configuration of Terminal Device 40; FIG. 1, FIG. 4)

The terminal device 40 (i.e. terminal devices 40A to 40D) as shown in FIG. 1 is a portable terminal which the user 4 possesses, such as a smartphone, a notebook PC, or a tablet PC, for example. As shown in FIG. 4, the terminal device 40 comprises a displaying unit 42, an operating unit 44, a BT I/F 46, a controller 50, and a memory 52. In a second embodiment to be described later, the terminal device 40 further comprises a microphone 48.

The displaying unit 42 is a display configured to display various types of information. The operating unit 44 includes a plurality of keys. The user 4 can input various instructions (e.g. changing instruction, outputting instruction) to the terminal device 40 by operating the operating unit 44. In the present embodiment, the displaying unit 42 is a so-called touch panel, and functions as an operating unit as well. The term "operating unit 44" hereinbelow encompasses both the operating unit 44 itself and the displaying unit 42 being the touch panel.

The BT I/F 46 is an I/F configured to execute BT communication with other device(s) (specifically the image display device 10). In the present embodiment, the controller 50 sends, to the image display device 10 via the BT I/F 38, instruction signals indicative of various instructions (e.g. changing instruction, outputting instruction) inputted to the operating unit 44.

The controller 50 executes various processes in accordance with programs stored in the memory 52. The memory 52 is constituted of a ROM, a RAM, and/or a hard disk for example, and stores various programs. The programs stored in the memory 52 include an application program (hereafter "specific application") for sending the instruction signals indicative of various instructions (e.g., changing instruction, outputting instruction) inputted to the operating unit 44 to the image display device 10 by performing BT communication with the image display device 10, details of which will be described later. The memory 52 further stores various data obtained or generated in a course of the controller 50 executing processes.

Figure 5:
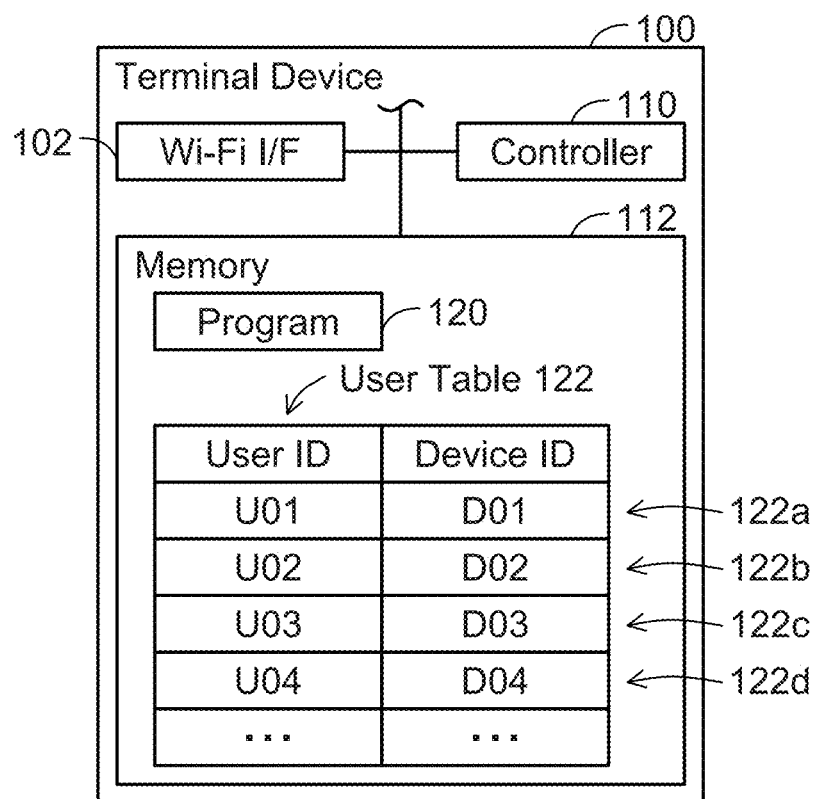
FIG. 5 illustrates a block diagram of a server.

(Configuration of Server 100; FIG. 1, FIG. 5)

The server 100 shown in FIG. 1 is a server arranged by an administrator of the conference system 2 (e.g., a provider of a conference service using the conference system 2). As shown in FIG. 5, the server 100 comprises a Wi-Fi I/F 102, a controller 110, and a memory 112.

The Wi-Fi 102 is an I/F configured to execute wireless communication with other device(s) (e.g., the image display devices 10A to 10D) via the Internet not shown.

The controller 110 is configured to execute various processes including a voice communication control process to be described later (see FIG. 5) in accordance with a program 120 stored in the memory 112. The memory 112 is constituted of a ROM, a RAM, and/or a hard disk for example. The memory 112 stores a user table 122 in addition to the program 120. The user table 122 includes plural pieces of combination information 122a to 122d indicative of respective combinations of the user ID of each user (i.e., users 4A to 4D) and the device ID of the image display device 10 the user uses (i.e. image display devices 10A to 10D). The plural pieces of combination information 122a to 122d are added to the user table 122 by each user registering his/her user ID and device ID to the server 100 in advance. For example, the combination information 122a indicates that the user ID "U01" indicative of the user 4A and the device ID "D01" indicative of the image display device 10A are associated with each other. Aside from this, the memory 112 has a region for storing various information (e.g., board output data to be described later) generated accompanying the processes executed by the controller 110.

Figure 6:
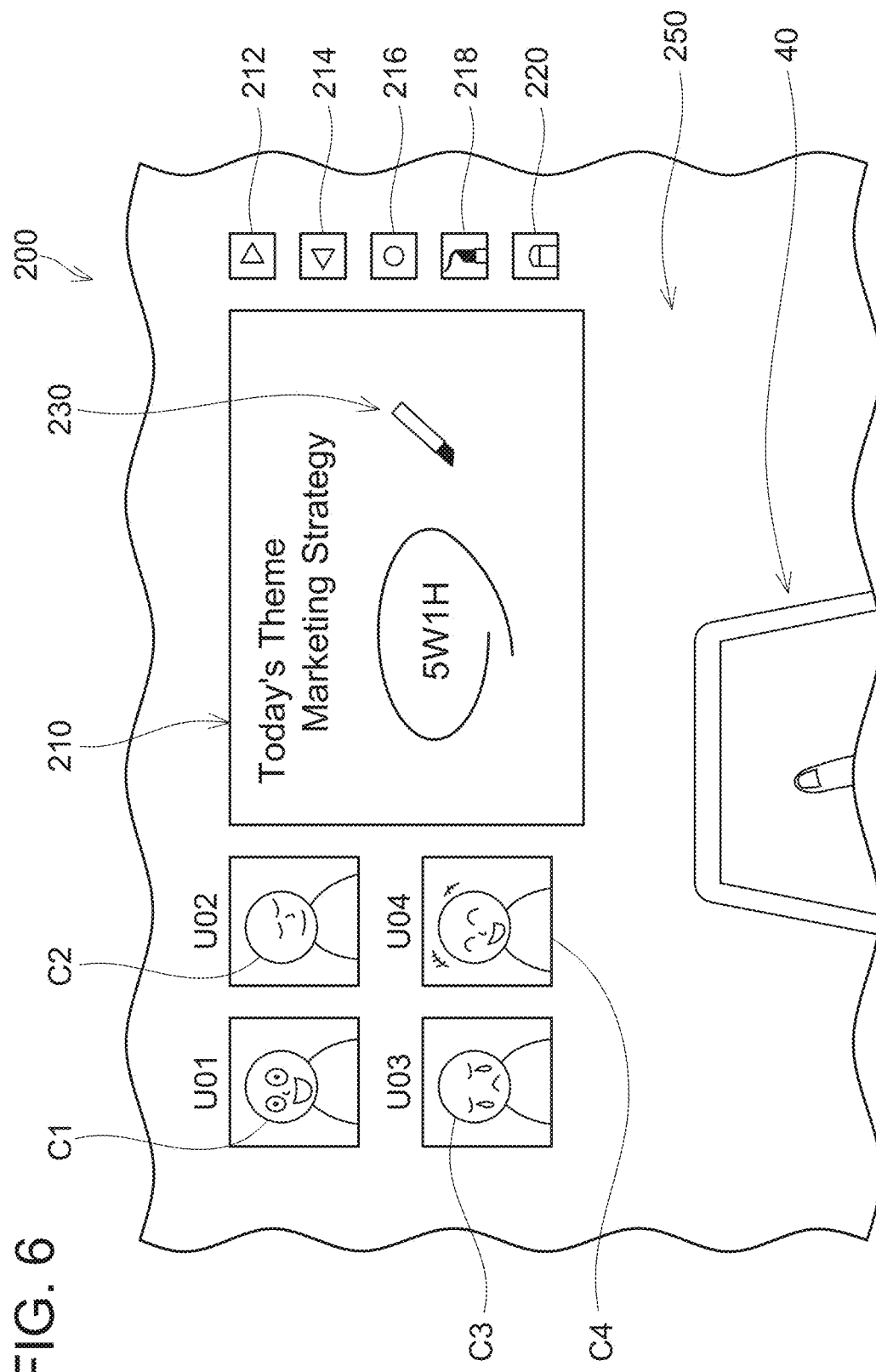
FIG. 6 illustrates an example of a display screen a user visually recognizes.

(Outline of Conference Held by Using Conference System 2; FIG. 6)

Next, with reference to FIG. 6, an outline of a conference held among the users 4 by using the conference system 2 will be described. Once a conference session in which the users 4A to 4D participate is initiated, each user 4 can have conversations (i.e. engage in voice communication) with the other users 4 while looking at a display screen 200 (see FIG. 6) displayed on the displaying unit 14 of the image display device 10 which the user 4 is wearing on his/her head. As shown in FIG. 6, the display screen 200 includes character images C1 to C4 representing the users 4A to 4D. Display patterns of the character images C1 to C4 change in real time in accordance with conditions of the respective users 4 (i.e., posture, line of sight, state of mind, health state, for example) during the conference.

The display screen 200 includes a whiteboard image 210 indicative of a virtual whiteboard. The users 4 participating in the conference can engage in voice communication while using the virtual whiteboard represented by the whiteboard image 210 as if it is a real whiteboard in a conference room. That is, the users 4 participating in the conference can communicate by voice while looking at same information displayed on the shared virtual whiteboard.

Page change buttons 212, 214, a data outputting button 216, a pen button 218, and an erase button 220 are displayed in vicinity of the whiteboard image 210. The display screen 200 further displays a cursor 230 operable by each user 4. Each user 4 can operate the operating unit 44 of the terminal device 40 to input operations for selecting the respective buttons 212 to 220 with the cursor 230.

The page change buttons 212, 214 are buttons for changing (forwarding or retracting) a displayed board (i.e. page) of the virtual whiteboard. When the page change buttons 212, 214 are operated, the displayed board of the virtual whiteboard represented by the whiteboard image 210 is changed.

The data outputting button 216 is a button for storing the board output data indicative of a displayed content of the virtual whiteboard in the memory 112 of the server 100. When the data outputting button 216 is operated, the board output data indicative of the displayed content of the virtual whiteboard is generated, and is stored in the memory 112 of the server 100. In a variant, the board output data may be outputted in any arbitrary manner instead of being stored in the memory 112. For example, the board output data may be e-mailed to an email address designated by the user 4, and/or may be printed out by a predetermined printer.

The pen button 218 is a button for using a pen which writes on the virtual whiteboard. When the pen button 218 is operated with the cursor 230, a displayed form of the cursor 230 changes into a pen shape. Then, by the user 4 inputting an instruction to the operating unit 44 to perform an operation of moving the cursor 230 on the whiteboard image 210, information (e.g. text, diagram) is written on the virtual whiteboard.

The erase button 220 is a button for using an eraser that erases the information on the virtual whiteboard. When the erase button 220 is operated with the cursor 230, the displayed form of the cursor 230 changes into an eraser shape. Then, by the user 4 inputting an instruction to the operating unit 44 to perform the operation of moving the cursor 230 on the whiteboard image 210, the information written on the virtual whiteboard is erased.

The display screen 200 further includes a predetermined background image 250. In the present embodiment, as the background image 250, a captured image of the outside cameras 27 of the image display device 10 the user 4 is wearing (i.e., an image corresponding to the field of vision of the user 4) is used. In the example of FIG. 6, the background image 250 includes an image of the terminal device 40. This means that the user 4 is directing his/her gaze toward the terminal device 40 the user 4 himself/herself is holding. The user 4 participating in the conference can operate the terminal device 40 while looking at the image of the terminal device 40 included in the background image 250.

The display screen 200 shown in FIG. 6 is an example of a display screen displayed on the displaying unit 14 of the image display device 10 of each user 4. In the display screen 200, other image(s) than the respective images shown in FIG. 6 (i.e. the character images C1 to C4, the whiteboard image 210, etc.) may be displayed.

Figure 7:
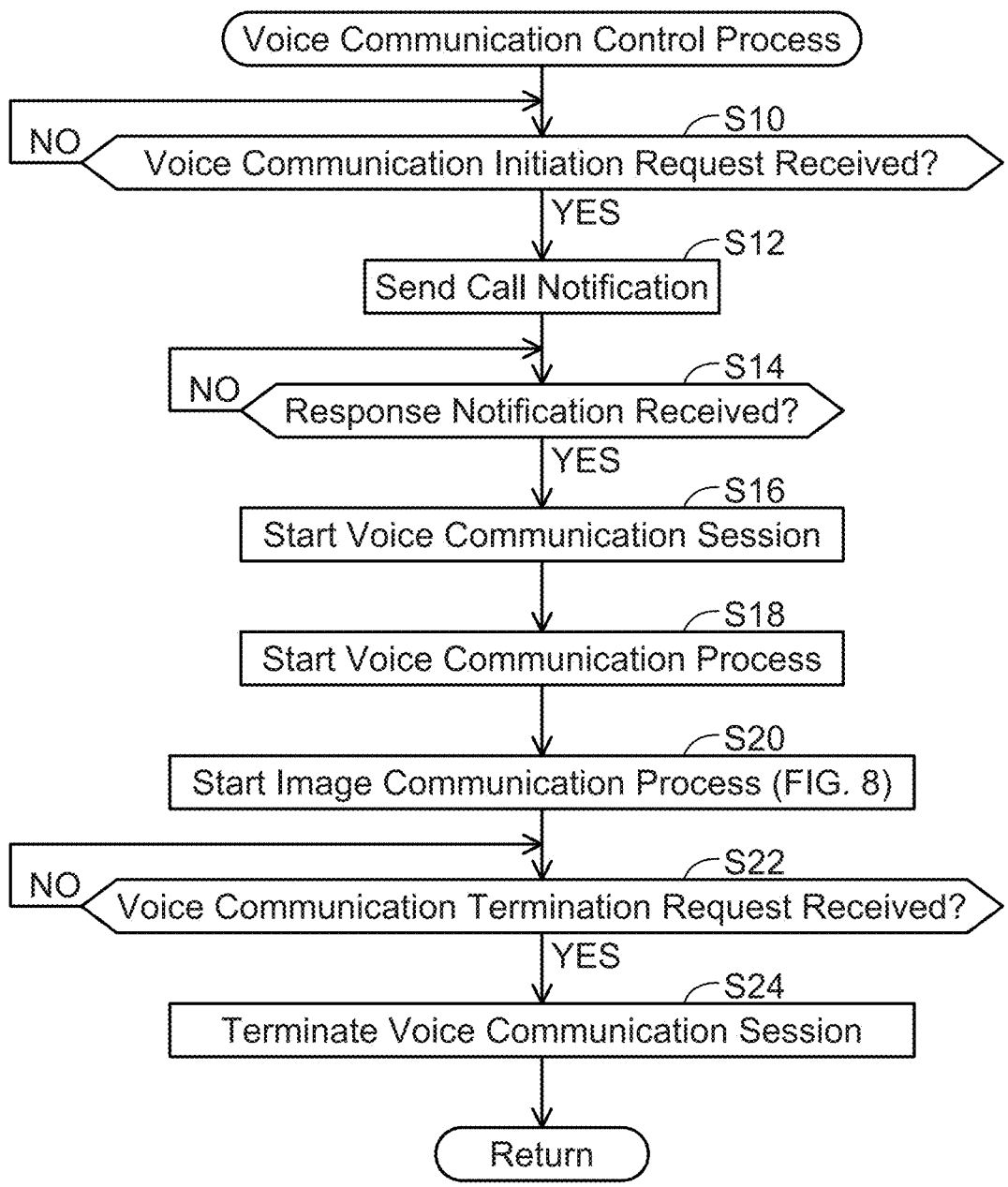
FIG. 7 illustrates a flow chart of a voice communication control process executed by a controller of the server.

(Voice Communication Control Process; FIG. 7)

The voice communication control process executed by the controller 110 of the server 100 in the present embodiment will be described with reference to FIG. 7. The voice communication control process is a process executed by the controller 110 of the server 100 for the users 4A to 4D of the user devices 8A to 8D to have conversations while looking at the display screen 200 (see FIG. 6) including the character images representing the respective users and the whiteboard image 210 representing the virtual whiteboard (i.e., have a video conference). Upon turn-on of the server 100, the controller 110 initiates the voice communication control process of FIG. 7.

In S10, the controller 110 monitors receipt of a voice communication initiation request from one or more of the image display devices 10. The voice communication initiation request is a request signal for requesting the server 100 to initiate voice communication participated by a plurality of the users. For example, the user 4A of the image display device 10A (see FIG. 1) turns on the power of the image display device 10A, and wears the same on his/her head. At this occasion, an image captured by the outside cameras 27 (i.e., image corresponding to the field of vision of the user) is displayed on the displaying unit 14. The user can acknowledge surrounding situations by looking at the captured image of the outside cameras 27. The user 4A operates the operating unit 44 of the terminal device 40 in a state as above, and causes the aforementioned specific application to start up. This start-up shifts the terminal device 40 and the image display device 10A to a state in which they are able to execute BT communication. The user 4A then operates the operating unit 44 to input a predetermined voice communication initiation operation. The predetermined voice communication initiation operation includes: an operation of inputting the user ID ("U01" in this example) indicative of the user 4A performing the voice communication initiation operation (hereafter "host user"); an operation of selecting the user IDs (e.g., "U02", "U03", and "U04") indicative of users to participate in the voice communication (hereafter "guest users", e.g., users 4B to 4D); and an operation of instructing initiation of the voice communication. When the voice communication initiation operation is inputted to the operating unit 44, the controller 30 of the image display device 10A receives a voice communication initiation signal indicative of the voice communication initiation operation from the terminal device 40 via the BT I/F 38. It should be noted that in the following description, the user 4 inputting various operations to the operating unit 44 and the signals indicative of the operated contents being sent to the image display device 10 via BT communication will be described simply as operations by the user 4. Then the controller 30 generates the voice communication initiation request including the inputted user ID of the host user ("U01") and the user IDs of the selected guest users ("U02" to "U04"), and sends the generated voice communication initiation request to the server 100 via the Wi-Fi I/F 36. In this case, the controller 110 of the server 100 receives the voice communication initiation request from the image display device 10A via the Wi-Fi I/F 102. When the controller 110 receives the voice communication initiation request, the controller 110 determines YES to S10 and proceeds to S12.

In S12, the controller 110 sends a call notification. In details, in S12, the controller 110 firstly refers to the user table 122 in the memory 112, and specifies the device IDs ("D02", "D03", and "D04" in the above example) corresponding to the user IDs ("U02", "U03", and "U04" in the above example) of the guest users included in the voice communication initiation request received in S10. Then the controller 110 sends the call notification via the Wi-Fi I/F 102 to each of the image display devices 10 (devices 10B, 10C, and 10D in the above example) indicated by the specified device IDs. The call notification is a signal for notifying the image display devices 10 the guest users are using that they have been invited to a voice communication session, and includes the user ID of the host user ("U01" in the above example) and the user IDs of the guest users ("U02", "U03", and "U04" in the above example). Upon receipt of the call notification, each of the image display devices 10 to which the call notification has been sent performs a predetermined call operation. The call operation includes generating a call sound from the speaker 24, and displaying the user ID of the host user, the user IDs of the guest users, and a call message on the displaying unit 14. The call operation can allow the user 4 who is using the image display device 10 to acknowledge that the user 4 has been invited to the voice communication session, and which users are to participate in the voice communication.

Subsequently, in S14, the controller 110 monitors receipt of a response notification from each of the image display devices 10 to which the call notification has been sent. As mentioned above, the image display devices 10 that receive the call notification perform the call operation. The user 4 of each image display device 10 which is performing the call operation (e.g., the user 4B of the image display device 10B) puts on the image display device 10, starts up the specific application of the terminal device 40B, and performs a predetermined response operation. The response operation includes one of a participation operation indicative of participation in the voice communication session and a rejection operation indicative of no participation in the voice communication session. When the response operation has been performed, the controller 30 of the image display device 10 generates a response notification including one of participation information indicative of the participation and rejection information indicative of rejection, and sends the generated response notification to the server 100. When the controller 110 of the server 100 receives the response notifications respectively from the image display devices 10 to which the call notification was sent, the controller 110 determines YES to S14 and proceeds to S16.

In S16, the controller 110 initiates a voice communication session. Specifically, the controller 110 firstly specifies the device ID of the image display device 10 of the host user.

Subsequently, the controller 110 specifies the device ID(s) of the image display device(s) 10 that had sent the response notification including the participation information from among the image display devices 10 of the guest users. Then, the controller 110 initiates the voice communication session including the image display device(s) 10 indicated by the specified device ID(s). That is, the voice communication session does not include the image display device(s) 10 that had sent the response notification including the rejection information.

(Process of Controller 30 of Each Image Display Device 10 after Initiation of Voice Communication Session)

When the voice communication session is initiated in S16 of FIG. 5, the controller 30 of each image display device 10 participating in the voice communication session performs the following process. That is, the controller 30 sends voice inputted to the microphone 22 to the server 100, and outputs voice from the speaker 24 based on voice data received from the server 100. This enables voice communication between the image display devices 10.

Then, the controller 30 generates condition information including the device ID of this image display device 10, a detected value of the three-dimensional sensor 34, a detected value of the biosensor 18, a detected value of the brain wave sensor 20, the voice signal inputted to the microphone 22, and an image of eyes captured by the inside cameras 26 at all times, and sends the same to the server 100. The controller 30 receives the display screen data for this image display device 10 from the server 100 in response to sending the condition information, and causes the displaying unit 14 to display the display screen 200 (see FIG. 6) represented based on the received display screen data. This allows the respective users 4 participating in the voice communication to have conversations while looking at the display screen 200 including the character images C1 to C4 indicative of the other users 4 and the whiteboard image 210 indicative of the virtual whiteboard.

Further, each of the users 4 can input the changing instruction for changing the displayed content of the virtual whiteboard in the display screen 200 (i.e., changing the displayed board, writing, or erasing information as aforementioned) to the operating unit 44 of the terminal device 40. Upon input of the changing instruction, the controller 30 sends changing instruction data indicative of a content of the inputted changing instruction to the server 100. The controller 30 then receives display image data indicative of the display screen 200 including the whiteboard image 210 the displayed content of which has been changed from the server 100 in response to the sending of the changing instruction data, and causes the displaying unit 14 to display the display screen 200 represented based on the received display image data. Due to this, the respective users 4 participating in the voice communication can have conversations while looking at the whiteboard image 210 whose displayed content has been changed.

Further, each of the users 4 can input an outputting instruction for outputting (i.e., storing in the memory 112 of the server 100) the displayed content of the virtual whiteboard in the display screen to the operating unit 44 of the terminal device 40. Upon input of the outputting instruction, the controller 30 sends outputting instruction data indicative of the outputting instruction to the server 100. As will be described later, when the outputting instruction data is sent to the server 100, the controller 110 of the server 100 generates board output data including the displayed content of the virtual whiteboard at this point in time, and stores the generated board output data in the memory 112. Thereafter, the user 4 can see a content of the board output data stored in the memory 112 by sending a browsing request to the server 100 via the image display device 10 at any arbitrary timing.

(Continuation of Voice Communication Control Process from S18 in FIG. 5)

In subsequent S18, the controller 110 initiates a voice communication process. That is, the controller 110 performs a process of relaying voice communication between the respective image display devices 10 participating in the voice communication session. That is, the controller 110 receives a voice signal inputted to the microphone 22 of the image display device 10 from each of the image display devices 10. The controller 110 generates voice output data based on the voice signals received from the respective image display devices 10, and sends the same to the respective image display devices 10.

Further, in S20, the controller 110 initiates an image communication process. Hereafter, with reference to FIG. 8, a content of the image communication process executed in S20 will be described in detail.

(Image Communication Process; FIG. 8)

The controller 110 initiates monitoring for each of S30, S50, and S70 after initiating the image communication process of FIG. 8.

In S30, the controller 110 monitors receipt of condition information from each image display device 10 participating in the voice communication session. As aforementioned, once the voice communication session is initiated (S16 of FIG. 7), the controller 30 of each image display device 10 participating in the voice communication session generates the condition information including the detected value of the three dimensional sensor 34, the detected value of the biosensor 18, the detected value of the brain wave sensor 20, the voice signal inputted to the microphone 22, and the image of the eyes captured by the inside cameras 26 at all times, and sends the same to the server 100. When the controller 110 receives the condition information as aforementioned which the respective image display devices 10 participating in the voice communication session had sent, the controller 110 determines YES to S30 and proceeds to S32.

In S50, the controller 110 monitors receipt of the changing instruction data from one or more of the image display devices 10 participating in the voice communication session. As mentioned above, each user 4 participating in the voice communication session can input the changing instruction as aforementioned to the operating unit 44 of the terminal device 40. In that case, the controller 30 of the image display device 10 sends the changing instruction data indicative of the content of the inputted changing instruction to the server 100. When the controller 110 receives the changing instruction data which the one or more of the image display devices 10 had sent, the controller 110 determines YES to S50 and proceeds to S52.

In S70, the controller 110 monitors receipt of the outputting instruction data from one or more of the image display devices 10 participating in the voice communication session. As aforementioned, each user 4 participating in the voice communication session can input the outputting instruction to the operating unit 44 of the terminal device 40. In that case, the controller 30 of the image display device 10 sends the outputting instruction data indicative of the outputting instruction to the server 100. When the controller 110 receives the outputting instruction data which the one or more of the image display devices 10 had sent, the controller 110 determines YES to S70 and proceeds to S72.

In S32 (in case of YES to S30), the controller 110 specifies one condition information from among one or more pieces of the received condition information (i.e., condition information received from one of the image display devices 10 participating in the voice communication session). Hereafter, the condition information specified in S32 may be referred to as "specific condition information". Further, the image display device 10 being the sender of the specific condition information may be referred to as "a specific image display device". Further, the user 4 using the specific image display device may be referred to as "a specific user".

In subsequent S34, the controller 110 specifies the condition of the specific user based on the specific condition information specified in S32. Here, the condition of the specific user includes, for example, a posture (including a face orientation, a body orientation), state of mind, physical condition, line of sight, and speech condition (i.e., whether user is speaking) of the specific user. In S34, the controller 110 firstly refers to the user table 122, and specifies the user ID corresponding to the device ID included in the specific condition information (i.e., user ID of the specific user). The controller 110 then specifies the condition of the specific user based on respective types of information included in the specific condition information. The controller 110 can specify the posture of the specific user based on the detected value of the three-dimensional sensor 34 included in the specific condition information. Further, the controller 110 can specify the state of mind of the specific user (e.g., being angry, happy, feeling anxious, or sad) based on the detected value of the biosensor 18, the detected value of the brain wave sensor 20, the voice signal inputted to the microphone 22, and the image of eyes captured by the inside cameras 26 that are included in the specific condition information. Further, the controller 110 can specify the physical condition of the specific user (e.g., being healthy, having a fever, feeling dizzy) based on the detected values of the biosensor 18 and the brain wave sensor 20 included in the specific condition information. Further, the controller 110 can specify the line of sight of the specific user based on the image of the eyes captured by the inside cameras 26 and the detected value of the three-dimensional sensor 34 included in the specific condition information. The controller 110 can specify the condition of the specific user by performing the respective processes as above. The controller 110 temporarily stores the user ID of the specific user and the specified condition of the user in association with each other in the memory 112.

In subsequent S36, the controller 110 generates the character image indicative of the specific user (see the reference signs C1 to C4 in FIG. 6). In the present embodiment, the character image is an image (so-called avatar) having a display pattern on which the condition (e.g. posture, state of mind, physical condition, line of sight, speech condition) specified in S34 is reflected.

In subsequent S38, the controller 110 determines whether all the one or more pieces of the condition information received in S30 have been specified. In a case where all the one or more pieces of the condition information have been specified at this point in time, the controller 110 determines YES to S38 and proceeds to S40. On the other hand, in a case where the one or more pieces of condition information have not all been specified, the controller 110 determines NO to S38, and returns to S32 where the controller 110 specifies another one of the un-specified piece(s) of the condition information as new specific condition information, and executes processes of S34 and S36.

In S40, the controller 110 generates the display screen data for the respective image display devices 10, where the display screen data includes the already-generated character images of the respective users and the whiteboard image indicative of the current virtual whiteboard. In the present embodiment, the content of the display screen data generated in S40 is the same among the respective image display devices 10. In a variant, the content of the display screen data generated in S40 may be different between the respective image display devices 10. In that case, the display screen data in each device may have a content on which the field of vision of the corresponding user is reflected.

In subsequent S42, the controller 110 sends each of the generated display screen data to the corresponding image display device 10. Upon receipt of the display screen data, the controllers 30 of the image display devices 10 each display the display screen 200 (see FIG. 6) represented by the received display screen data on the displaying unit 14. After S42 ends, the controller 110 returns to the monitoring of S30, S50, S70.

On the other hand, in S52 (in case of YES to S50), the controller 110 generates the whiteboard image (see the reference sign 210 in FIG. 6) indicative of the virtual whiteboard on which the change content (e.g., writing or erasing of information, change of displayed board) indicated by the changing instruction indicated by the changing instruction data. Then, in subsequent S40, the controller 110 generates the display screen data for each image display device 10 that includes the whiteboard image generated in S52. The process of subsequent S42 is the same as above.

On the other hand, in S72 (in case of YES to S70), the controller 110 generates the board output data including the displayed content of the virtual white board at this point in time. The board output data may be the whiteboard image itself that is being displayed on each image display device 10 at this time. In another example, the board output data may be text data which is being displayed on the virtual whiteboard at this point in time.

In subsequent S74, the controller 110 causes the memory 112 to store the board output data generated in S72. After S74 ends, the controller 110 returns to the monitoring of S30, S50, S70.

The controller 110 repeats to execute the processes of S30 to S74, by which the content of the display screen 200 displayed on the displaying units 14 of the respective image display devices 10 changes in real-time according to the conditions of the respective users 4 (e.g. line of sight, state of mind, posture) and the content of the changing instructions inputted by the respective users 4. Each user 4 can experience a feeling as if the user 4 is actually having conversations in person with the other user(s) 4. Further, each user 4 can experience the feeling as if the users 4 are in a face-to-face conference and looking at one same whiteboard. Further, each user 4 can see the content of the board output data stored in the memory 112 by sending a browsing request to the server 100 via the image display device 10 at any time.

(Continuation of Voice Communication Control Process from S22 in FIG. 7)

As mentioned above, the voice communication process is initiated in S18 of FIG. 7 and the image communication process is initiated in S20, by which each user 4 participating in the voice communication can have conversations while looking at the display screen including the character images and the whiteboard image.

In subsequent S22, the controller 110 monitors receipt of a voice communication termination request from one or more of the image display devices 10 participating in the voice communication session. The voice communication termination request is a request signal for requesting the server 100 to terminate the current voice communication session. For example, the user 4A of the image display device 10A participating in the voice communication session can conduct a predetermined voice communication termination operation on the operating unit 16. In that case, the controller 30 of the image display device 10A sends the voice communication termination request to the server 100. When the controller 110 receives the voice communication termination request, the controller 110 determines YES to S22 and proceeds to S24.

In S24, the controller 110 terminates the voice communication session. After S24 ends, the controller 30 returns to S10 to monitor receipt of the voice communication initiation request again.

The configuration and operation of the conference system 2 in the present embodiment was described as above. In the present embodiment, once the voice communication session is initiated, the display screen 200 for the corresponding image display device 10 is displayed on the displaying unit 14 of each image display device 10 participating in the voice communication session (see FIG. 6). The display screen 200 includes the whiteboard image 210 indicating the virtual whiteboard in which each user can write information. The whiteboard image 210 included in the display screen 200 displays the information written by the respective users 4 participating in the voice communication session. Accordingly, each user 4 can see the whiteboard image 210 in which same information is written by looking at the display screen 200 displayed on the displaying unit 14 of the corresponding image display device 10. Further, each user 4 can also change the displayed content of the whiteboard image 210 (e.g., writing of information, erasing of information, and change of displayed board) by inputting the changing instruction to the operating unit 44 of the terminal device 40. That is, the respective users can communicate with each other as if the users are having a conference in a space where the virtual whiteboard exists. The present embodiment allows the respective users 4 of two or more user devices 8 to communicate with each other while acknowledging the same information written on the shared virtual whiteboard.

Further, in the present embodiment, one or more of the users 4 participating in the voice communication session inputs the outputting instruction to the operating unit 44 of the terminal device 40, by which the board output data indicative of the displayed content of the virtual whiteboard is stored in the memory 112 of the server 100 (i.e., is outputted). Thereafter, each user 4 can see the content of the board output data stored in the memory 112 at any desired timing by sending the browsing request to the server 100 via the image display device 10.

Further, in the present embodiment, once the voice communication session is initiated, the controller 30 of each image display device 10 participating in the voice communication session sends the voice signal inputted to the microphone 22 to the server 100, and outputs the voice from the speaker 24 based on the voice data received from the server 100. Due to this, in the present embodiment, the respective users 4 can engage in voice communication with each other. Even when the users 4 are in remote places, the users 4 can engage in voice communication with each other while acknowledging the same information written on the shared virtual whiteboard.

Further, in the present embodiment, each user device 8 is constituted of the image display device 10 and the terminal device 40. Since the terminal device 40 for inputting various instructions is provided separately from the image display device 10 worn on the head, the user 4 can more easily input the various instructions than in the case where an input unit for inputting various instructions is provided on the image display device 10. Further, user convenience will be further improved if a smartphone for example which each user 4 already possesses can be used as the terminal device 40 for inputting instructions.

Further, in the present embodiment, the display screen 200 displayed on each of the displaying units 14 of the image display devices 10 of the users 4 includes the character images C1 to C4 indicative of the respective users 4 (see FIG. 6). Each of the character images C1 to C4 has the display pattern that depends on the condition (i.e., condition of the user) indicated by the condition information received from the corresponding image display device 10. That is, each of the character images C1 to C4 appropriately reflects the condition of the corresponding user 4. Due to this, in the present embodiment, even if each user 4 does not perform a particular operation, each user 4 can engage in voice communication while looking at the display screen 200 on which the conditions of the respective users 4 are appropriately reflected. Each user 4 can engage in voice communication as if he/she is having face-to-face conversations and seeing the postures and facial expressions of the user 4 himself/herself and the other user(s) 4.

The server 100 is an example of "an information processing apparatus". The changing instruction data and the outputting instruction data are an example of "first instruction data" and "second instruction data". Each of the terminal devices 40 is an example of "an operating terminal". Each of the operating units 44 is an example of "an input unit". The voice which each user 4 inputs to the microphone 22 is an example of "a first type of voice". The voice outputted from each speaker 24 is an example of "a second type of voice". The inside cameras 26, the microphones 22, the biosensors 18, and the brain wave sensors 20 are examples of "an acquiring unit".

SECOND EMBODIMENT

In the present embodiment, as shown in FIG. 4, the terminal devices 40 each have a microphone 48. In the present embodiment, each user 4 can input various instructions such as the changing instruction, outputting instruction and the like by inputting voice spoken by the user to the microphone 48. That is, in the present embodiment, each user 4 can input the various instructions by voice. The present embodiment reduces operational burden of each user 4. The microphones 48 in the present embodiment are examples of the "input unit."

THIRD EMBODIMENT

The present embodiment is different from the first embodiment in that the image display devices 10 can communicate with each other without an intervention of the server 100. Specifically, the image display devices 10 are capable of conducting near field communication (specifically BT communication) via the BT I/Fs 38 with each other. That is, in the present embodiment, the controller 30 of each image display device 10 is capable of conducting BT communication with the other image display device(s) 10 via the BT I/Fs 38.

In the present embodiment, a voice communication session including the image display devices 10 is initiated in a case where a predetermined operation of initiating talking is performed while a wireless connection via the BT I/Fs 38 (i.e. BT connection) is established between the image display devices 10. Once the voice communication session is initiated, each of the controllers 30 of the image display devices 10 executes the voice communication process shown in FIG. 9.

In S100, the controller 30 firstly displays an initial display screen on the displaying unit 14. In the present embodiment, the display screen displayed on the displaying unit 14 includes, similar to the display screen 200 of FIG. 6, the whiteboard image 210, the buttons 212 to 220, and the background image 250, but does not include the character images (see C1 to C4 of FIG. 6). Further, the whiteboard image 210 included in the display screen displayed at this point in time does not have any information written thereon.

In subsequent S102, the controller 30 sends voice data indicative of the voice inputted to the microphone 22 to other image display device(s) 10 being communication counterpart(s). In S104, the controller 30 outputs voice from the speaker 24 based on voice data received from the other image display device(s) 10 being the communication counterpart(s). With the processes of S102 and S104, the present embodiment also enables voice communication between the image display devices 10.

In S106, the controller 30 determines whether the display screen data is received from the other image display device(s) 10 being the communication counterpart(s). The controller 30 determines YES to S106, and proceeds to S108 if the display screen data has been received from the other image display device(s) 10 being the communication counterpart (s) at this point in time. In S108, the controller 30 displays the display screen displayed based on the received display screen data on the displaying unit 14. After S108 ends, the process proceeds to S110. On the other hand, the controller 30 skips S108 and proceeds to S110 if the display screen data has not been received from the other image display device(s) 10 at this point in time.

In S110, the controller 30 determines whether the changing instruction for changing the displayed content of the virtual whiteboard (i.e., change of the displayed board, writing or erasing of information as aforementioned, for example) in the display screen has been inputted at this point in time to the operating unit 44 of the corresponding terminal device 40. The controller 30 determines YES to S110 and proceeds to S112 if the changing instruction has been inputted at this point in time. In S112, the controller 30 generates the display screen data including the whiteboard image the displayed content of which was changed according to the changing instruction. In subsequent S114, the controller 30 displays the display screen displayed based on the display screen data generated in S112 on the displaying unit 14. In subsequent S115, the controller 30 sends the display screen data generated in S112 to the other image display device(s) 10 being the communication counterpart. After S115 ends, the process proceeds to S116. On the other hand, the controller 30 determines NO to S110 if the changing instruction has not been inputted at this point in time, and the controller 30 skips S112 to S115 and proceeds to S116.

In S116, the controller 30 determines whether the outputting instruction for outputting the displayed content of the virtual whiteboard in the display screen has been inputted at this point in time to the operating unit 44 of the corresponding terminal device 40. The controller 30 determines YES to S116, and proceeds to S118 if the outputting instruction has been inputted at this point in time. In S118, the controller 30 generates board output data including the displayed content of the virtual whiteboard of this point in time. In subsequent S119, the controller 30 stores the board output data generated in S118 in the memory 32. The board output data stored in the memory 32 is outputted to the server 100 in a case where the image display device 10 and the server 100 are shifted into a state of being communicable with each other. After S119 ends, the process returns to S102. On the other hand, if the outputting instruction has not been inputted at this point in time, the controller 30 determines NO to S116, skips S118 and S119, and returns to S102.

Henceforth, the controller 30 repeats the processes of S102 to S119 until the predetermined voice communication termination request is outputted from one or more of the image display devices 10 and the voice communication session is terminated.

In a case where a situation where wireless communication (Wi-Fi communication) is executable between the respective image display devices 10 and the server 100 according to the present embodiment is established, the conference system 2 holds a conference in accordance with the method described in the first embodiment instead of the method described in the present embodiment.

As mentioned above, in the present embodiment, even in a situation where the image display device 10 of each user 4 is not able to communicate with the server 100, the image display devices 10 communicate with each other without an intervention of the server 100, as a result of which the users 4 can communicate with each other while acknowledging the same information written on the shared virtual whiteboard.

As mentioned above, in the present embodiment, the display screen displayed on the displaying units 14 of the image display devices 10 does not include the character images (see C1 to C4 of FIG. 6). This is a result of consideration on a fact that a data communication speed of the BT communication executed between the image display devices 10 is slower than a data communication speed of the Wi-Fi communication executed between each image display device 10 and the server 100. Since the display screen data transmitted and received between the image display devices 10 does not include the character images in the present embodiment, a processing load and a BT communication load on the controllers 30 of the image display devices 10 can be minimized.

In a variant for the present embodiment, each user 4 may be able to write only text data on the virtual whiteboard and may not be able to add (e.g., paste) an image and the like thereon for purpose of the same reason. In this case also, the processing load and the BT communication load on the controllers 30 of the image display devices 10 can be minimized.

Nevertheless, in another variant of the present embodiment, the display screen displayed on the displaying units 14 of the respective image display devices 10 may include character image(s).

While specific embodiments have been described above in detail, these embodiments are merely illustrative and place no limitation on the scope of the patent claims. The technology described in the patent claims also encompasses various changes and modifications to the specific examples described above. For example, the following variants may be adopted.

(Variant 1) In each of the above embodiments, the controller 110 of the server 100 stores the generated board output data in the memory 112 (S72, S74) in the case where the outputting instruction data is received (YES to S70 of FIG. 8). Such a configuration does not cast any limitation, and the controller 110 may output the board output data with any other arbitrary method. For example, the controller 110 may email the board output data to an email address designated by the user 4. In another example, the controller 110 may transmit the board output data to a printer designated by the user 4 to cause the printer to print the data.

(Variant 2) In each of the above embodiments, once the voice communication session is initiated, the controllers 30 of the respective image display devices 10 each sends the voice signal inputted to the microphone 22 to the server 100, and outputs the voice from the speaker 24 based on the voice data received from the server 100. That is, the users 4 can engage in voice communication with each other in each of the above embodiments. Such a configuration does not cast any limitation, and each controller 30 may not perform the respective processes as aforementioned for the voice communication. That is, the voice communication that uses the respective microphones 22 and speakers 24 may not be performed. In this variant, the users 4 may have a face-to-face conversation (e.g., brief talks while standing, conversations when being in a same conference room) while looking at the display screen 200 (see FIG. 6). In this case also, the users 4 can communicate with each other while acknowledging the same information written on the shared virtual whiteboard.

(Variant 3) In each of the above embodiments, the terminal devices 40 for the users 4 to input various instructions are each a mobile terminal device the users 4 possess. Such a configuration does not cast any limitation, and the terminal devices 40 may be replaced with any means for inputting instructions so long as each user 4 is able to input various instructions to the means and the means is able to communicate with the image display devices 10. For example, the terminal devices 40 may be replaced with a keyboard or the like operable by each user 4.

(Variant 4) In each of the above embodiments, each user device 8 includes the image display device 10 and the terminal device 40. Such a configuration does not cast any limitation, and each user device 8 may only include the image display device 10, and the terminal device 40 may be omitted. In that case, each user 4 may input various instructions such as the changing instruction by operating the operating unit 16. In another example, each user 4 may input various instructions by voice via the microphone 22.

(Variant 5) In each of the above embodiments, the character images C1 to C4 are avatars representing the users 4A to 4D. Such a configuration does not cast any limitation, and the character images may be, for example, images obtained by processing photograph images of users.

(Variant 6) The display screen 200 may not include the character images C1 to C4.

(Variant 7) From the image display devices 10, at least one of the biosensor 18, the brain wave sensor 20, the inside cameras 26, and the three dimensional sensor 34 may be omitted.

(Variant 8) In each of the above embodiments, each user device 8 includes the image display device 10 which is a head-mounted display worn on the head of the user 4 and the mobile terminal device 40. Such configuration of the user devices does not cast any limitation, and any arbitrary configuration may be adopted. For example, a wristwatch-type user device worn on a wrist of the user may be adopted. Further for example, each image display device 10 worn on the head of the user may comprise an image projector configured to project a display screen on a nearby screen. The users may be able to visually recognize the display screen projected on the screen.

(Variant 9) In each of the above embodiments, in the virtual whiteboard in the display screen, information (e.g. text, figures) is written as if it is written by a pen accompanying with the operation of the user(s) moving the cursor (see the reference sign 230 in FIG. 6). Such a configuration does not cast any limitation, and each user is able to write text data in the virtual whiteboard in the display screen by performing a predetermined text inputting operation. Similarly, each user is able to paste a file (e.g. an image file) on the virtual whiteboard in the display screen by performing a predetermined file inserting operation. In this variant, the board output data may include only the text data and/or the file data added in the virtual whiteboard.

Reference Example

Further, a reference example, one aspect of the art disclosed herein, will be introduced. In the present reference example, the conference system 2 may not comprise the server 100. In the present reference example, a conference may be held by the image display devices 10 performing BT communication with each other, and further by the image display devices 10 performing the voice communication process in accordance with the method described in the third embodiment (see FIG. 9).

The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

The invention claimed is:

1. A conference system comprising:
two or more user devices; and
an information processing apparatus communicably connected with each of the two or more user devices,
wherein each of the two or more user devices comprises:
a frame wearable by a user;
a displaying unit disposed on the frame and arranged in a field of vision of the user who is wearing the frame;
an input unit to which the user inputs an instruction; and
a controller, wherein the controller comprises:
a first device receiving unit configured to receive display screen data for the user device;
a display control unit configured to cause the displaying unit to display a display screen represented by the received display screen data, the display screen including a virtual whiteboard on which each user of the two or more user devices is capable of writing information; and
a first device sending unit configured to send first instruction data indicative of a changing instruction to the information processing apparatus in a case where the changing instruction for instructing to change a displayed content on the virtual whiteboard is inputted to the input unit,
the information processing apparatus comprises:
a first apparatus receiving unit configured to receive the first instruction data;
a first apparatus generating unit configured to generate the display screen data for each of the two or more user devices, wherein the virtual whiteboard included in the display screen represented by the display screen data displays the displayed content changed based on the first instruction data; and
a first apparatus sending unit configured to send the display screen data generated for each of the two or more user devices, wherein
the first device sending unit is configured to send the first instruction data indicative of the changing instruction to the information processing apparatus in the case where the changing instruction including at least one of instruction for writing information on the virtual whiteboard and instruction for erasing information on the virtual whiteboard is inputted to the input unit by the user.

2. The conference system as in claim 1, wherein each of the first device sending units is further configured to send second instruction data indicative of an outputting instruction for instructing an output of the displayed content on the virtual whiteboard in a case where the outputting instruction is inputted, and
the information processing apparatus further comprises:
a second apparatus receiving unit configured to receive the second instruction data;
a second apparatus generating unit configured to generate board output data indicative of the displayed content on the virtual whiteboard in a case where the second instruction data is received; and
an outputting unit configured to output the board output data.

3. The conference system as in claim 2, wherein the outputting of the board output data includes causing a storage to which each of the two or more user devices is accessible to store the board output data.

4. The conference system as in claim 1, wherein each of the two or more user devices further comprises:
a microphone to which a first type of voice spoken by the user wearing the frame is inputted; and
a speaker configured to output a second type of voice according to voice output data, and
the controller further comprises:
a second device sending unit configured to send the first type of voice inputted to the microphone to the information processing apparatus;
a second device receiving unit configured to receive the voice output data from the information processing apparatus; and
a voice output controlling unit configured to cause the speaker to output the second type of voice according to the received voice output data, and
the information processing apparatus further comprises:
a third apparatus receiving unit configured to receive the first type of voice;
a third apparatus generating unit configured to generate the voice output data for each of the two or more user devices; and
a second apparatus sending unit configured to send, to each of the two or more user devices, the voice output data generated for the corresponding user device.

5. The conference system as in claim 1, wherein each of the input units includes a voice input unit to which the user is capable of inputting an instruction with a first type of voice spoken by the user.

6. The conference system as in claim 1, wherein each of the two or more user devices includes:
a head-mounted display including the frame, the displaying unit, and the controller; and
an operating terminal separate from the head-mounted display, communicable with the head-mounted display, and including the input unit.

7. The conference system as in claim 1, wherein each of the two or more user devices further comprises:
an acquiring unit configured to acquire condition information relating to a condition of the user wearing the frame,
each of the controllers further comprises:
a third device sending unit configured to send the condition information acquired by the acquiring unit to the information processing apparatus, and
the information processing apparatus further comprises:
a fourth apparatus receiving unit configured to receive the condition information; and
a fourth apparatus generating unit configured to generate two or more character images, the two or more character images respectively representing the users wearing the two or more user devices, and each of the two or more character images having a display pattern corresponding to a condition indicated by the condition information received from the corresponding user device, and
the display screen represented by the screen display data further includes at least a part of the generated two or more character images.

8. The conference system as in claim 1, wherein the two or more user devices are further communicable with one another without an intervention of the information processing apparatus, and
each of the controllers further comprises:
a third device receiving unit configured to receive the display screen data from the user device being a communication counterpart without the intervention of the information processing apparatus;
a device generating unit configured to generate the display screen data for each of the two or more user devices in a case where the changing instruction is inputted to the input unit, wherein the virtual whiteboard included in the display screen represented by the display screen data displays a displayed content changed based on the changing instruction; and
a fourth device sending unit configured to send the generated display screen data to the user device being the communication counterpart.

9. A conference system comprising:
two or more user devices; and
an information processing apparatus communicably connected with each of the two or more user devices,
wherein each of the two or more user devices comprises:
a frame wearable by a user;
a displaying unit disposed on the frame and arranged in a field of vision of the user who is wearing the frame;
an input unit to which the user inputs an instruction; and
a controller, wherein the controller comprises:
a first device receiving unit configured to receive display screen data for the user device;
a display control unit configured to cause the displaying unit to display a display screen represented by the received display screen data, the display screen including a virtual whiteboard on which each user of the two or more user devices is capable of writing information; and
a first device sending unit configured to send first instruction data indicative of a changing instruction to the information processing apparatus in a case where the changing instruction for instructing to change a displayed content on the virtual whiteboard is inputted to the input unit, the information processing apparatus comprises:
- a first apparatus receiving unit configured to receive the first instruction data;
- a first apparatus generating unit configured to generate the display screen data for each of the two or more user devices, wherein the virtual whiteboard included in the display screen represented by the display screen data displays the displayed content changed based on the first instruction data; and
- a first apparatus sending unit configured to send the display screen data generated for each of the two or more user devices, wherein each of the two or more user devices includes:
- a head-mounted display including the frame, the displaying unit, and the controller; and
- an operating terminal separate from the head-mounted display, communicable with the head-mounted display, and including the input unit, and the display unit is configured to display a display screen including an image of the operating terminal.

10. A conference system comprising:
two or more user devices; and
an information processing apparatus communicably connected with each of the two or more user devices,
wherein each of the two or more user devices comprises:
- a frame wearable by a user;
- a displaying unit disposed on the frame and arranged in a field of vision of the user who is wearing the frame;
- an input unit to which the user inputs an instruction; and
- a controller, wherein the controller comprises:
  - a first device receiving unit configured to receive display screen data for the user device;
  - a display control unit configured to cause the displaying unit to display a display screen represented by the received display screen data, the display screen including a virtual whiteboard on which each user of the two or more user devices is capable of writing information; and
  - a first device sending unit configured to send first instruction data indicative of a changing instruction to the information processing apparatus in a case where the changing instruction for instructing to change a displayed content on the virtual whiteboard is inputted to the input unit, the information processing apparatus comprises:
- a first apparatus receiving unit configured to receive the first instruction data; a first apparatus generating unit configured to generate the display screen data for each of the two or more user devices, wherein the virtual whiteboard included in the display screen represented by the display screen data displays the displayed content changed based on the first instruction data; and
- a first apparatus sending unit configured to send the display screen data generated for each of the two or more user devices, wherein the displaying unit is configured to display a plurality of buttons and a cursor, and each of the two or more user devices includes an operating terminal for selecting the buttons with the cursor.

* * * * *